United States Patent [19]

Srdoch

[11] 4,314,173
[45] Feb. 2, 1982

[54] MOUNTING BRACKET FOR BRACING PERIPHERAL CONNECTING RINGS FOR DYNAMOELECTRIC MACHINES' STATOR WINDINGS

[75] Inventor: Rudolph R. Srdoch, Trafford, Pa.

[73] Assignee: Westinghouse Electric Corp., Pittsburgh, Pa.

[21] Appl. No.: 139,078

[22] Filed: Apr. 10, 1980

[51] Int. Cl.³ .............................................. H02K 3/46
[52] U.S. Cl. .................................................. 310/260
[58] Field of Search .............. 310/260, 270, 194, 180, 310/184, 71

[56] References Cited

U.S. PATENT DOCUMENTS

| | | | |
|---|---|---|---|
| 268,205 | 11/1882 | Edison | 310/194 |
| 1,238,280 | 8/1917 | Field | 310/260 |
| 2,677,067 | 4/1954 | Johnson et al. | 310/260 |
| 2,848,634 | 8/1958 | Decaudaveine | 310/260 |
| 3,089,048 | 5/1963 | Bahn et al. | 310/260 |
| 3,348,085 | 10/1967 | Coggeshall et al. | 310/260 |
| 3,435,517 | 4/1969 | Fortenbach et al. | 310/260 X |
| 3,543,067 | 11/1970 | Tharp | 310/194 |
| 4,126,799 | 11/1978 | Iogansen et al. | 310/260 |

*Primary Examiner*—Mark O. Budd
*Attorney, Agent, or Firm*—W. D. Lanyi

[57] ABSTRACT

A mounting bracket for bracing C-shaped peripheral connecting ring segments situated in the stator end regions of a dynamoelectric machine stator structure. Mounting brackets are connected to both ends of the stator structure at desired circumferential positions. Each mounting bracket has a foundation structure which includes a base portion and a spacer retaining leg portion situated on each end thereof. A base spacer having several teeth separated slots is engageable with the base and retaining leg portions. The base spacer is secured in engagement by a bolt extending therethrough between retaining leg portions such that the slots face away from the base. L-shaped and T-shaped spacers are engageable in a cooperative configuration with the base spacer between the retaining leg portions such that the notches at the intersections of the legs of the T-shaped and L-shaped spacers cooperate with the base spacer's slots to provide channels for receiving and retaining the peripheral connector ring segments. The T-shaped and L-shaped spacers are secured in the cooperative configuration by a bolt extending therethrough between the spacer retaining leg portions.

4 Claims, 4 Drawing Figures

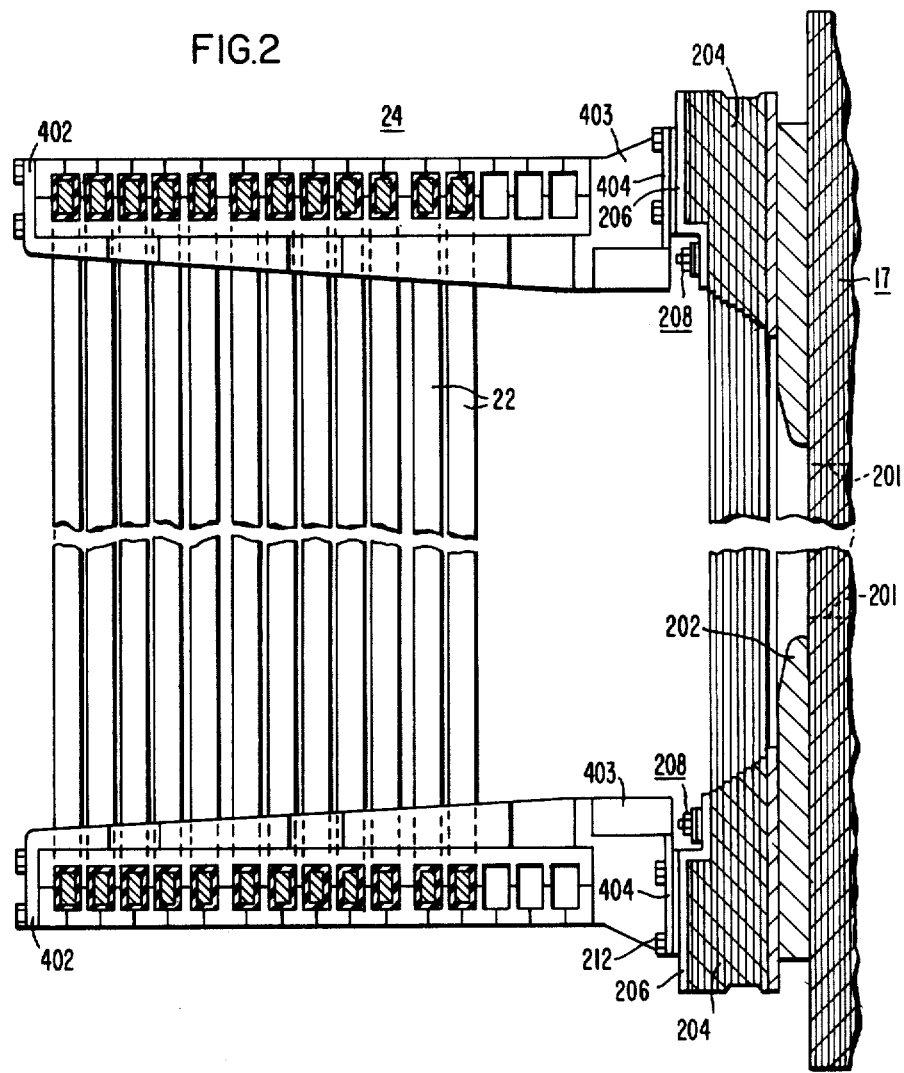

MOUNTING BRACKET FOR BRACING PERIPHERAL CONNECTING RINGS FOR DYNAMOELECTRIC MACHINES' STATOR WINDINGS

BACKGROUND OF THE INVENTION

1. Field of the Invention

This invention relates to dynamoelectric machines having stator members with multilooped coils disposed therein, and more particularly to a system for bracing stator end region peripheral connecting ring segments which electrically connect individual coil sides to form the coils.

2. Description of the Prior Art

Large dynamoelectric machine designs have evolved which use a stator winding of complex shape to handle the voltages and currents required by loads imposed on modern power generation systems. The large number of slots formed in a typically tubular stator core, the use of parallel windings in each phase, and multiple loop coils per phase necessitate the use of a complicated end connection scheme for electrically joining slot-disposed coil sides into a stator winding. Such connection scheme conforms to a restricted space, provides rugged construction, and allows necessary connections between stator coil sides.

The present solution to this problem consists of an end basket made by weaving together "diamond"-shaped coil loops. Each loop on the multiple loop coil is constructed from two coil sides each of which consists of a straight portion that extends the length of the stator slots and a complicated curved, end turn portion at each end thereof. Multiple coil sides are usually disposed in each slot in top (radially inner) and bottom (radially outer) positions. The coil sides of each loop are disposed in different positions in separate slots. This end turn portion has a complex shape which bends axially, radially and circumferentially. The manufacturing of the coil sides requires a three-dimensional form (typically of wooden construction) against which the copper coil sides are bent and twisted to form the end turn portions. The stator coil sides are woven together in the end turn regions to form "diamond"-shaped coils to provide an end basket structure.

Such end basket structure provides the necessary stator coil side connections in a reasonably compact and rugged structure. The support system for the diamond-shaped coils included triangular-shaped blocks of an insulating material such as Micarta which were laced to parallel phase rings disposed at one end of the machine. The support for the end turn windings was provided by maintaining resin-impregnated pads in compressive engagement between the blocks and the coil side end turn portions. One of the major disadvantages of this end basket structure is that the coil side interweaving of the "diamond"-shaped coil loops makes it impossible to remove a single coil side from the bottom of a stator slot without removing from twelve to eighteen of the adjacent top coil sides which block its removal in the end region.

When field repair or replacement of a bottom stator coil side in such a dynamoelectric machine is necessary, many top coils in the vicinity of the to-be-repaired bottom coil side must also be removed to access the bottom coil side. Removal of the top coil sides is a costly and tedious process considering the fact that the repair is usually done in the field. The coil side removal process also requires disassembly of the micarta bracing and resin impregnated pads associated with the coil sides. In this process of unbracing the machine and removing coil sides the machine is especially vulnerable to additional damage. Once the machine is disassembled and repaired, the coil sides must be reinserted in the slots and the micarta blocks and resin-impregnated pads must be reshaped and reassembled under field conditions.

In copending application by Mr. L. J. Long having Ser. No. 139,083, filed on Apr. 10, 1980, and assigned to the assignee of this application, there is disclosed a dynamoelectric machine which has a stator winding comprising a plurality of stator coil loops each of which includes two straight coil sides which run the entire length of the stator slots and extend rectilinearly into the end region. A generally circular connector ring segment passes between stator slots in an end region of the stator and connects the two straight coil sides to form a complete coil loop. The connector ring segment is typically constructed to the same specification as is the stator coils.

The dynamoelectric machine disclosed in the aforementioned application has a stator core and a plurality of coils constituting a stator winding disposed in the stator core. Each of the coils includes two coil sides that extend a predetermined axial distance from the core and a connector ring segment which joins the coil sides to form a complete coil loop. The length of the two coil sides varies with the coil loop so that commonly slotted coil sides are of different lengths and the potential for interference between adjacent connector ring segments is minimized. The resulting peripheral connector ring segments together provide a generally cylindrical structure on both axial ends of the stator.

Disclosed herein is a mounting bracket that provides effective support for all connector ring segments while allowing easy removal of any selected connector ring segment. Each mounting bracket generally comprises a foundation structure which is cantilevered from each end of the stator and a plurality of spacers which are attached to the foundation structure. A plurality (the number depending on the size of the stator) of mounting brackets are joined to each axial end of the stator at selected circumferential positions. Each foundation structure constitutes a base portion and spacer support leg portions which extend perpendicularly from the base portion from each axial end thereof. The spacers are assembled with the connecting ring segments and are attached to the foundation structures by fastener means which extend through each spacer and the spacer support leg portions. Fastener means such as screw bolts provide retention of the spacers and connector ring segments to the foundation structures.

The disclosed mounting bracket for bracing end turn connector ring segments has the following advantages over prior art end turn support structures:

(1) A stator coil end turn structure that is more rugged than the prior art;

(2) Readily assembleable and disassembleable spacers for reducing the installation or repair time for the peripheral connector rings segments and/or coil sides;

(3) Increased stator coil rigidity over that of the prior art bracing system; and (4) Augmentation of the bracing for the stator coil sides.

BRIEF DESCRIPTION OF THE DRAWINGS

Many other advantages and purposes of this invention will be clear from reading the following detailed description of the drawings:

FIG. 2 is a transverse, partial sectional view of a stator end region illustrating the bracing of the peripheral connector ring segments in accordance with this invention;

DESCRIPTION OF THE PREFERRED EMBODIMENT

Figure 1:
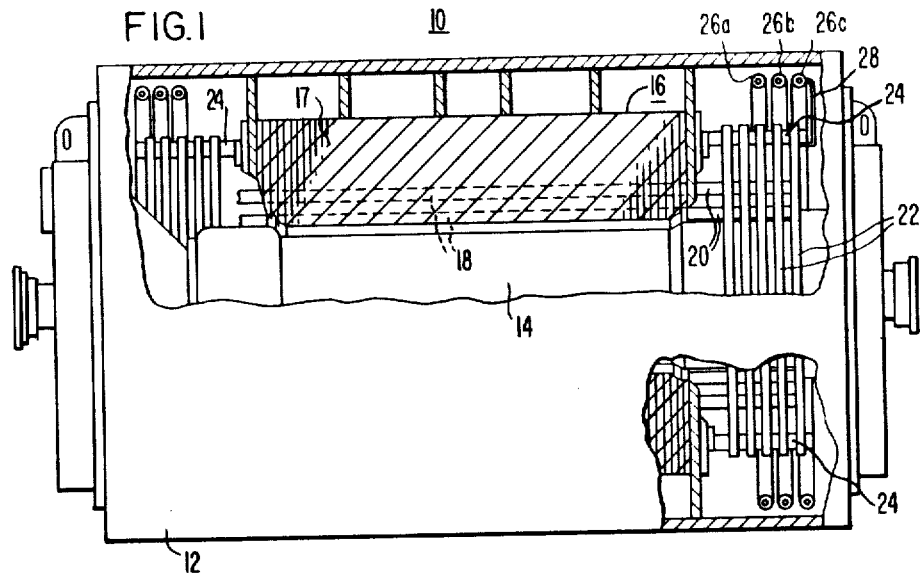
FIG. 1 is a partial sectional view of a dynamoelectric machine made in accordance with this invention.

Referring now to the drawings in detail, FIG. 1 shows a partial sectional view of a dynamoelectric machine 10 having an outer casing 12, a rotor 14 and a stator structure 16 including stator core 17 which has multi-loop coils 18 disposed in slots formed therein. The coil loops are arranged in the stator 16 and interconnected to form the stator winding. Each of the coil loops has two coil sides 20 which are embedded within the stator slots (not shown) in circumferentially displaced relationship around the inner periphery stator core 17 and a connector ring segment 22 which joins the coil sides 20. The connector ring segments 22 are held in place by mounting brackets 24. On one or both ends of the stator 16, as appropriate, there is a plurality of rings (26a, 26b, and 26c, . . . ) which provides electrical connections between appropriate stator coils 18 and the generator's external connections.

In FIG. 2 there is an enlarged, partial sectional view of a stator end turn region illustrating the mounting bracket 24 made in accordance with the present invention. The stator core 17 constitutes a plurality of annular laminations (laminations are not individually shown) which are stacked together. Each lamination has a segmented, circular shape and a plurality of notches formed around its inner periphery. When the laminations are stacked together and the notches are aligned, axial slots obtain for receiving the stator winding. Circular-shaped finger plates 202 are disposed on each end of the stator core 17 and have a plurality of slots formed around its inner periphery. Plates 202 provide mechanical support of stator 16. Segmented laminations 204 are disposed adjacent finger plates 202 and provide magnetic shielding and dampening. Core support plates 206 disposed on each axial end of stator core 17 adjacent laminations 204 provide support to the stator core laminations and constitute part of stator structure 16. Laminations 204, finger plates 202, and stator core laminations are compressed together by through bolts 208.

Mounted around the periphery of the stator bore 18, at selected circumferential positions is a plurality of connector ring segment mounting brackets 24. The mounting brackets 24 secure the cylindrical stack of connector ring segments 22 in a rigid position, as shown in FIG. 2.

Figure 4:
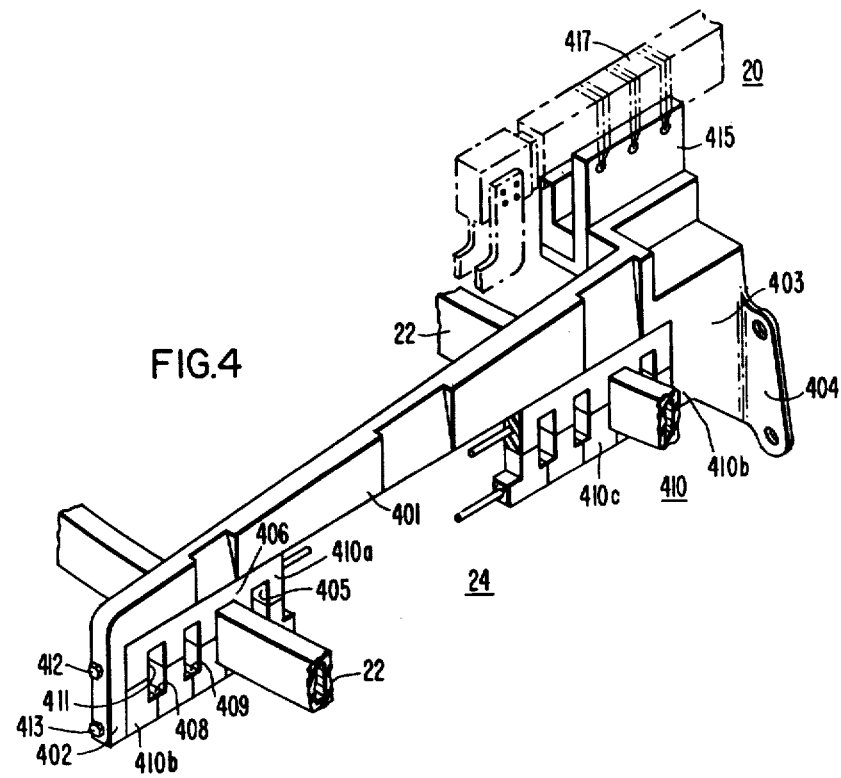
FIG. 4 is a pictorial view of an individual mounting bracket for the peripheral connector ring segments made in accordance with the present invention.

FIG. 4 is a pictorial view of a mounting bracket 24 which constitutes a foundation structure and spacers 410. The foundation structure includes a base portion 401 which is attachable to and cantilevered from the dynamoelectric machine's core-support plate 206 and spacer retaining leg portions 402 and 403 which are disposed on opposite axial ends of the base portion 401. The mounting plate 404 is situated adjacent the leg portion 403 and is securable to the core-support plate 206 by fasteners 212 which engage the support plate 206 as illustrated in FIG. 2.

Figure 3:
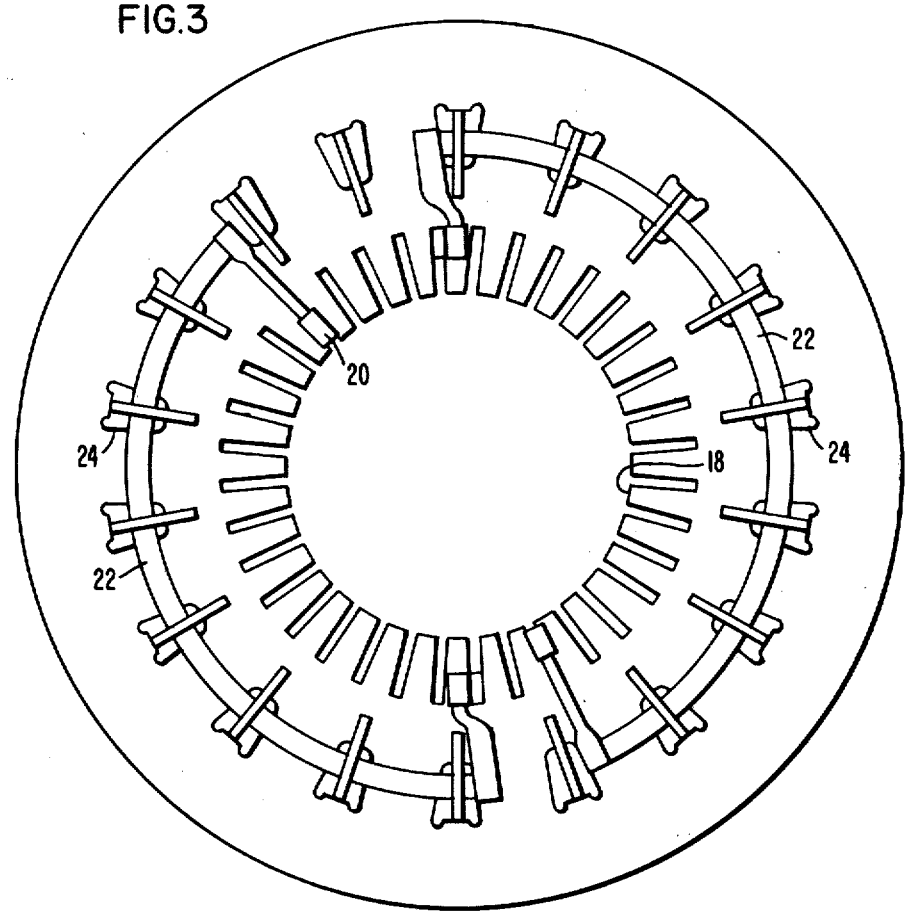
FIG. 3 is an axial elevation view of the stator end region of FIG. 2 illustrating the bracing of the peripheral connecting ring segments made in accordance with the present invention.

FIGS. 3 and 4 show connector ring segments 22 clamped between spacers 410 (preferably comprising Micarta) which are connected to the foundation structure 400. Three separate types of spacers are utilized with foundation structure 400. Base spacer 410a is of predetermined length and has slots 405 which are separated by teeth 406. Multiple numbers of base spacers 410a can be utilized for greater numbers of connector ring segments 22 than is illustrated. The spacer 410a is, when assembled, engageable with base portion 401 between retaining leg portions 402 and 403. L-shaped spacers 410b are shown in FIGS. 3 and 4 in assembled engagement with base spacer 410a's teeth and retaining leg portions 402 and 403. T-shaped spacers 410c are engageable with each other, with teeth 406 of the base spacer 410a, and with L-shaped spacers 410b. Base spacer slots 405 and notches 408 and 409 on the L-shaped and T-shaped spacers cooperate when the spacers 410 are assembled to form channels 411 for retention of the peripheral connector ring segments 22. Screwbolts 412 and 413 are used to retain the spacers 410a, 410b and 410c in the desired configuration with the foundation structure 400. Bolt 412 is receivable in an axial opening through retaining leg portion 402 and base spacer 410a and engages retaining leg portion 403. Bolt 413 is receivable in an axial opening through retaining leg portion 402, extends through the first L-shaped spacer 410b, protrudes through aligned openings in T-shaped spacers 410c, extends through the second L-shaped spacer 410b, and engages retaining leg portion 403. The combination of the L- and T-shaped spacers 410b and 410c, respectively, cooperate with base spacer 410a to provide the plurality of channels 411 within which the peripheral connector ring segments 22 are retained. Mounting bracket 24 has top coil Micarta bracing block 415 for securing the axial extensions of coil side 20. Coil side 20 extends axially from the stator core 17 and is joined to the Micarta bracing block 415 by lacing 417. This provides additional stability to the peripheral connector ring segments 22.

As is now apparent, mounting brackets 24 individually restrain radial and axial movement of connector ring segments 22 and collectively minimize any circumferential movement thereof. The cooperative shapes of the spacers 410 permit rapid assembly and disassembly of the bracing scheme, while at the same time, provide positive, reliable restraint of the connector ring segments 22.

What is claimed is:

1. A dynamoelectric machine comprising:
  a generally tubular-shaped stator core structure having slots along the inner periphery thereof;
  a stator winding having a plurality of coil sides disposed in said stator core slots and a plurality of connector ring segments disposed in the stator core's end regions for electrically connecting said coil sides; 'a plurality of mounting brackets disposed at both ends of said stator core at selected circumferential positions for bracing said connector ring segments, each of said mounting brackets comprising;
(a) a foundation structure attached to and cantilevered from said stator core structure;
(b) a plurality of spacers disposable about said connector ring segments for restraining relative movement of said connector ring segments and for maintaining selected separations therebetween; and
(c) means for securing said spacers to said foundation structure for restraining relative movement therebetween; and wherein said foundation structure comprises;
(a) a base portion extending generally axially from said stator core structure; and
(b) a spacer retaining leg portion disposed perpendicularly to said base portion at each end thereof.

2. The dynamoelectric machine of claim 1, wherein said means for securing said spacers to said foundation structure comprises:
an axial opening in said retaining leg portions and said spacers; and
a plurality of fasteners receivable in said axial openings.

3. The dynamoelectric machine of claim 1, wherein said spacers comprise:
a plurality of base spacers each having a plurality of slots therein separated by teeth;
a plurality of L-shaped spacers wherein one of said plurality of L-shaped spacers is mounted on each axial end of said foundation structure, said L-shaped spacers each having a first and a second leg, said first leg being engageable with said base spacer and with said foundation structure; and
a plurality of T-shaped spacers mounted between said L-shaped spacers and adjacent said base spacers, said T-shaped spacers cooperatively engaging said base spacers and said L-shaped spacers to provide a plurality of retaining channels for receiving and restraining said connector ring segments.

4. A mounting bracket for securing peripheral connector ring segments to a stator core structure comprising:
a foundation structure having two spacer retaining leg portions extending perpendicularly from opposite ends of a base portion;
a base spacer having a plurality of teeth separated by slots, said base spacer being engageable with said base portion between said spacer retaining leg portions;
a first L-shaped spacer engageable with one spacer-retaining leg portion and a base spacer tooth;
a second L-shaped spacer engageable with the other spacer-retaining leg portion and another base spacer tooth;
a plurality of T-shaped spacers engageable with said base spacer teeth and said L-shaped spacers, said base, L-shaped, and T-shaped spacers cooperating to provide a configuration having a plurality of channels for receiving and retaining said peripheral connector ring segments;
means for securing said spacers in said cooperative configuration with said foundation structure;
wherein said mounting bracket is cantilevered from said stator core structure.

* * * * *